United States Patent [19]

Egnor

[11] Patent Number: 5,180,309

[45] Date of Patent: Jan. 19, 1993

[54] AUTOMATED ANSWER EVALUATION AND SCORING SYSTEM AND METHOD

[75] Inventor: Michael E. Egnor, Orlando, Fla.

[73] Assignee: United States of America as represented by the Secretary of the Navy, Washington, D.C.

[21] Appl. No.: 621,420

[22] Filed: Dec. 4, 1990

[51] Int. Cl.$^5$ .............................................. G09B 7/00
[52] U.S. Cl. ..................... 434/323; 434/327; 434/353; 434/362; 273/430; 364/411
[58] Field of Search ............... 434/322, 323, 327, 332, 434/353, 354, 169, 176, 258, 335, 359, 362; 273/429, 430, 273; 364/410, 44

[56] References Cited

U.S. PATENT DOCUMENTS

| | | | |
|---|---|---|---|
| 3,701,205 | 10/1972 | Wolf | 434/328 |
| 4,234,933 | 11/1980 | Adelson et al. | 364/900 |
| 4,593,904 | 6/1986 | Graves | 434/323 X |
| 4,652,998 | 3/1987 | Koza et al. | 364/412 |
| 4,671,772 | 6/1987 | Slade et al. | 434/219 |
| 4,695,257 | 9/1987 | Vawter | 434/333 |
| 4,705,479 | 11/1987 | Marion | 434/353 X |
| 4,926,255 | 5/1990 | Von Kohorn | 434/323 X |
| 4,941,829 | 7/1990 | Estes et al. | 434/118 |

Primary Examiner—Richard J. Apley
Assistant Examiner—Joe H. Cheng
Attorney, Agent, or Firm—Robert W. Adams

[57] ABSTRACT

Apparatus and method are disclosed for achieving automated evaluation and scoring of a participant's response to questions selected pseudo-randomly. A plurality of questions are available for each of a plurality of categories, in a question file. For each question there is an answer in an answer file. The answer includes characters preselected to denote a tolerance that permits a partially correct answer automatically to be credited to the participant's point total. A perfect answer is worth a predetermined full-credit value that is the same for each question; and, a partially correct answer that is within the tolerance for that question, is worth a predetermined fraction of the full-credit value. Pseudo-random selection of the questions from the question file is performed by a number generator that is seeded from the system's clock with the time of day that the system is activated. Each selection by the participant of a category for a question, steps every category to its next question and corresponding answer. The questions are presented on the system's display, and the participant's answers are provided by way of a keyboard.

1 Claim, 3 Drawing Sheets

AUTOMATED ANSWER EVALUATION AND SCORING SYSTEM AND METHOD

BACKGROUND OF THE INVENTION

The present invention relates generally to the field of learning and, more specifically, to the field of automated question and answer sessions in which the player interacts with a device that is prepared to present questions and then evaluate the player's response.

Prior art systems that are microcomputer based, generally are inflexible in their evaluation of a player's response and fail to tolerate answers that deviate slightly from the pre-programmed answer. Typically, the systems employ computer programs that evoke a rigidly structured question and answer session after the player has made a selection from a list of available categories. Points are accumulated only for perfect answers and are summed to a total for the uninterrupted session that may comprise ten questions, for example. Within any category selected by the player, the question sequence does not vary; and, within and session, the category will not change.

SUMMARY OF THE INVENTION

The present invention overcomes the disadvantages of the prior art by providing a method having the objective of automatically allotting partial credit for a player's response that is less than perfect but is within a preselected tolerance that is associated with the preprogrammed answer to the question. Another object of the invention is to provide the apparatus and method with a tolerance that may predeterminedly vary from answer to answer and that is preselectable for each answer, by incorporating the tolerance within the characters that form the preprogrammed answer. Another object is to provide an apparatus and method wherein the player may move to another category after he has successfully answered a question. Another object is to provide an apparatus and method wherein the questions presented to the player appear to be randomly selected.

The achievement of these and other objects that will become apparent, are in accordance with the description of the invention that follows.

DESCRIPTION OF A PREFERRED EMBODIMENT

Figure 1:
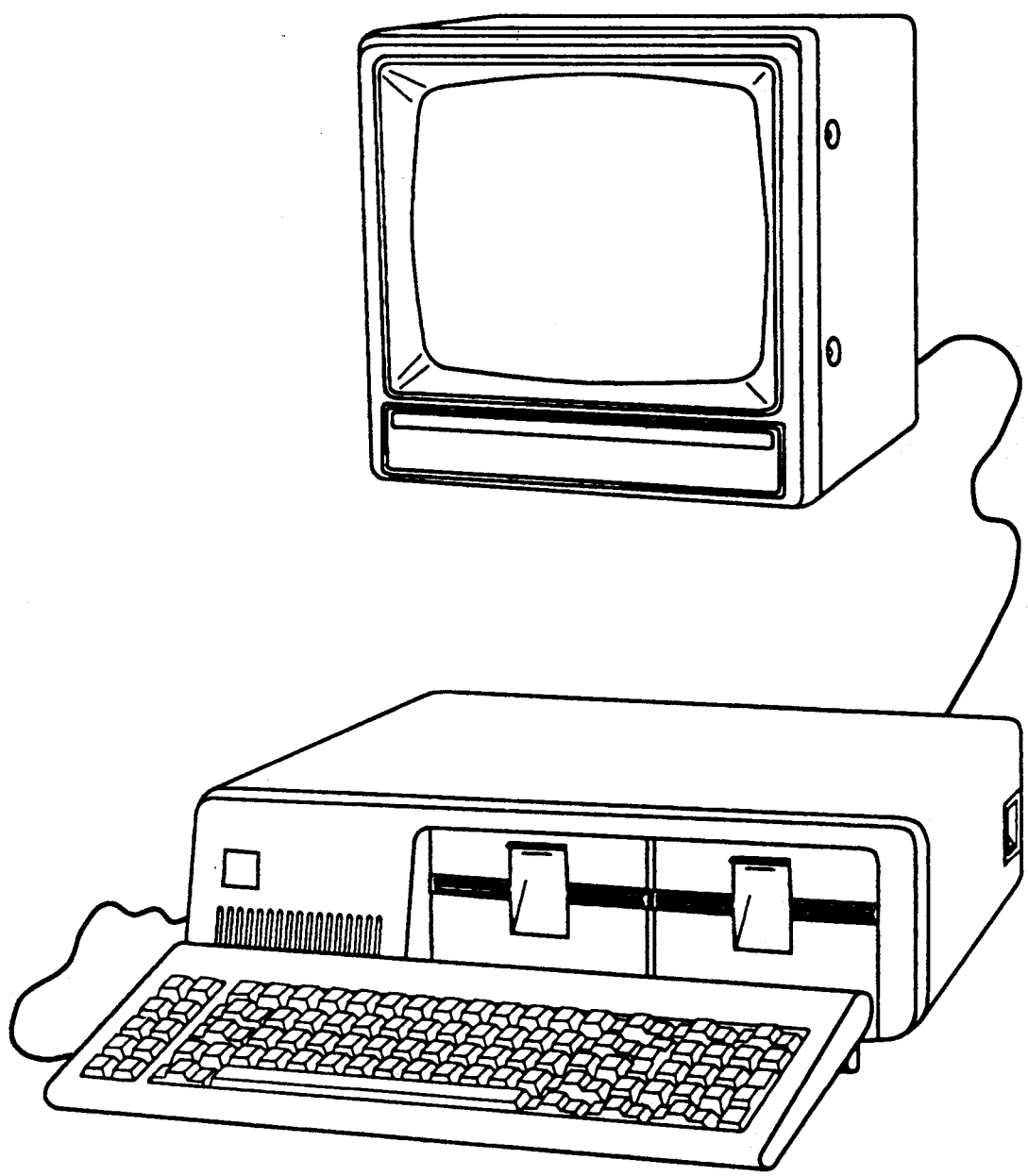
FIG. 1 is a block diagram of a preferred embodiment of the present invention.
Figure 2:
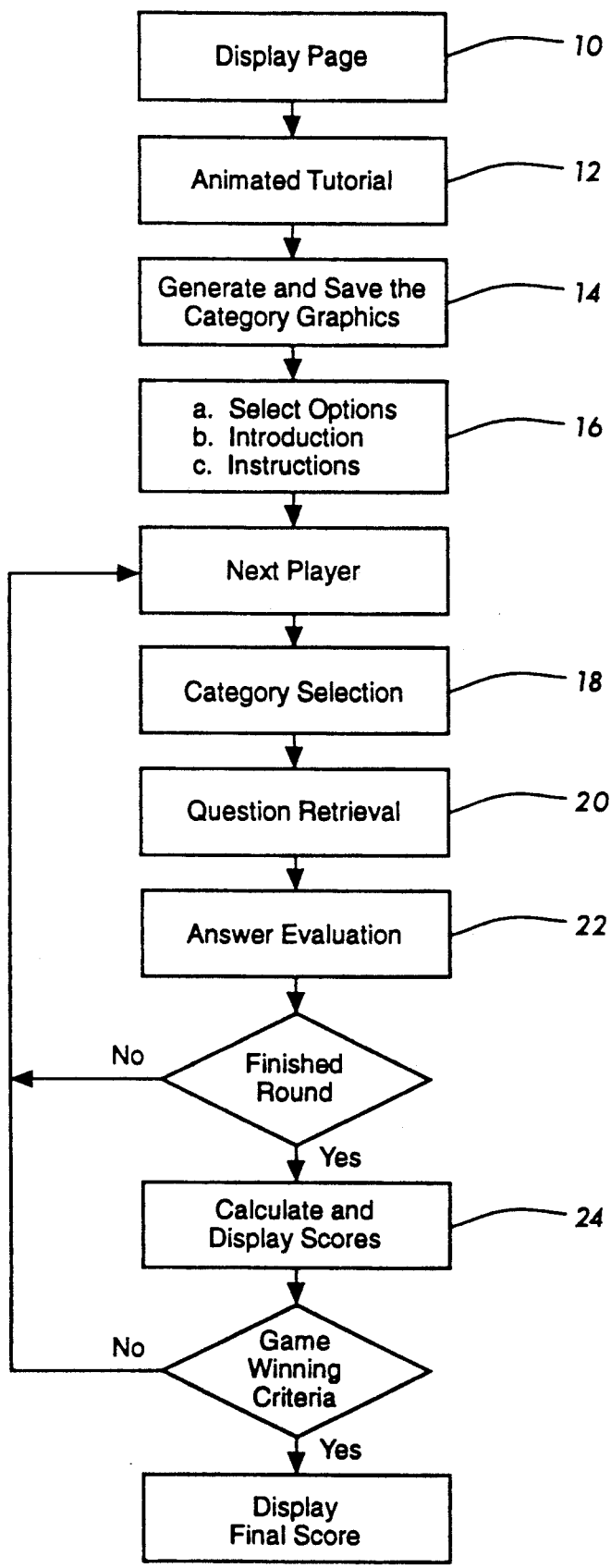
FIG. 2 is a block diagram showing the organization of the computer program that is disclosed in the preferred embodiment.
Figure 3:
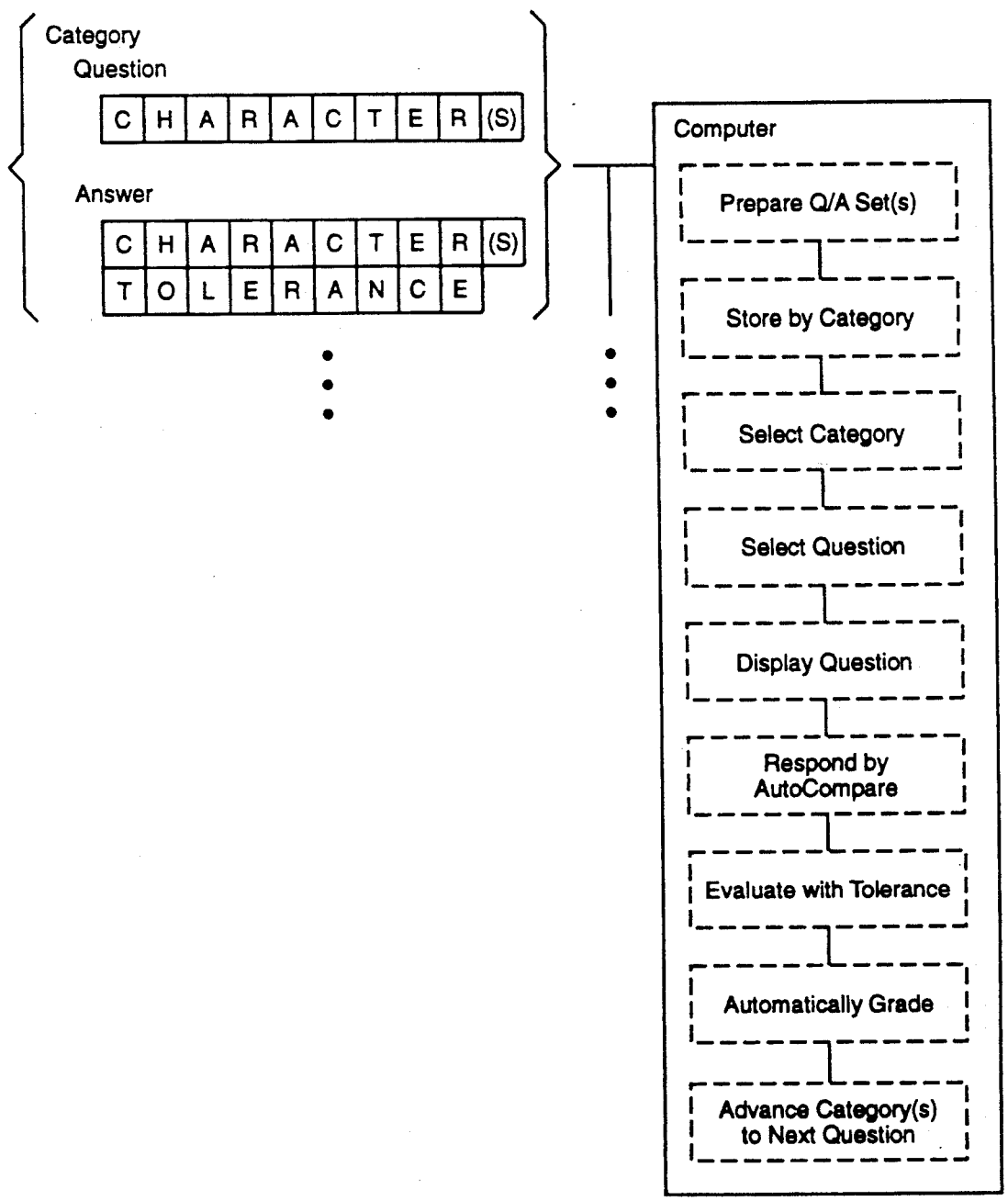
FIG. 3 is a block diagram of the claimed method.

The embodiment of the present invention that will be described is shown in FIG. 2. FIG. 2 shows the organization of the process that is performed in accordance with the computer program that converts for purposes of practicing the invention a general purpose computer into a special purpose training device, a piece of educational equipment, or an interactive game system. The source code of the computer program that will be described, and that has reduced to practice the process of the present invention for an automatic scoring, interactive game of questions and answers on various facets of the Soviet Union, is included herewith as Appendix A.

Display page 10 is similar to a title page. For example, it can give the name of the software, the organizations that develop the software, and the organization for which the software was developed. Animated tutorial 12 can be included at the start of the game to entertain the user and introduce him to the general categories of the subject matter. Music or other audio programming can be included at this time. For example, the Soviet national anthem can be played during tutorial 12 for the game of Soviet trivia.

In accordance with the source code of the example provided in Appendix A, the data base is divided into five categories. The first is Soviet Geography. Then comes Soviet People, followed by Soviet History, Soviet Navy, and The Other Four Armed Services. Each category is identified by an 80 pixel by 80 pixel graphic display. In addition, a graphic display of a Wild Card is included, also in an 80 pixel by 80 pixel format. These displays are generated and saved in generate and save stage 14 using Basic graphic routines.

Now, the program is prepared to elicit responses from the user that first will prepare the game for playing, and thereafter will enter answers to the questions presented on the computer's display by the program. On menu page 16 the user may select from the several options. The game can be played with the sound on, or off. A more difficult version of the game can be selected. From one to six players can participate. And, the user can choose first to view an introduction page and- /or instruction page, or advance directly to the game.

Category selection page 18 presents to each player the three panels that are 80 pixel by 80 pixel each. The player then is required to pick one of the displayed categories by selecting its panel number. The value that will be awarded to the player for a correct answer to the question that is then displayed, is determined by how many of the panels match the selected category. For example, if a category appears in one panel and a question is worth 50 points, the question will be worth 100 points if the category also appears in a second panel, and will be worth 150 points if the category appears in all three panels. The wild card icon will automatically match any category selected. The categories to be displayed are selected by a Basic random number generator that is seeded with the time of day. In accordance with the source code attached as Appendix A, the panels are shown side by side on the display.

At question page 20, a question is retrieved from the question data base based on the category that was selected by the player. In each of the five categories there are 185 questions that together comprise the data base Question. Dat. Each question is allotted up to 128 characters. The retrieved question then is displayed to the player who is allowed a preselected period of time to answer the question. In the example, the player is given 180 seconds to enter his answer. The number of characters that should appear in the player's answer will be displayed in the standard version of the game unless the spaces would give away the answer, such as true (four spaces) or false (five spaces).

Each player enters his answer by using the computer's keyboard. Each character appears on the display as it is keyed. The character will appear at the position denoted by an arrow that represents the cursor. The arrow cursor moves one position for each character entered by the player.

The answer entered by the user is evaluated at answer evaluation page 22. The player's answer is evaluated character by character with the answer in the data base Answer.Dat. For each question in Question.Dat there is a corresponding answer in Answer.Dat. Each answer in Answer.Dat contains within its 128 characters one or more characters that designate a tolerance which is used to evaluate a partially correct answer by the player. If the strings match exactly in the character by character comparison of the player's answer to the answer in Answer.Dat, full value is given for the answer. If only some of the characters match, partial credit will be awarded if the percentage of correct characters to total characters is within the tolerance for that answer. For example, if the designated tolerance is 0.6 then partial credit will be awarded for a partially correct answer if at least sixty percent of the characters in the player's answer match the characters in the answer found in Answer.Dat. Partial credit may be one-half the value of full credit, for example, in which case partial credit is given by dividing the value of full credit by two.

For answers such as True and False, partial credit would not be appropriate. The tolerance would be zero; the number of characters that should appear in the player's answer would not be shown on the display. And, it would be necessary for the player's answer to exactly match the answer in Answer.Dat for the player to be credited with points. If the tolerance is greater than zero but less than one, the program will evaluate the player's answer as a character string; the number of characters that should appear in the player's answer will be underscored in the standard version of the game; and, the player will be credited will the question's full point value for an answer that matches the answer in Answer.Dat. The player will be credited for a partially correct answer with a lesser point value as described above, if his answer has at least the correct minimum number of characters based on the tolerance as a percentage. Since the tolerance is part of the answer in Answer.Dat, the value of the tolerance that is chosen between zero and one can be used to permit the game to grant different degrees of forgiveness for spelling errors in the answers to different questions. If the tolerance is greater than one, the question calls for a numerical answer. The player's answer will be correct and full credit will be given if it does not vary from the answer in Answer.Dat more than plus or minus the tolerance.

To win the game a player must score a preselected sum of points and correctly answer at least two questions from each of the five categories. He will continue to receive questions as long as the correctly answers them. When all of the players have missed one of their questions, the round ends. At the end of each round a game status page 24 is displayed and the scores of each player are evaluated by the program to determine whether any player has achieved the game winning criteria. If none have, the program will return to category selection page 18 for the next question, and continue until someone wins.

Display page 10 is listed in Appendix A beginning at Line 150. Shown are a title page beginning at Line 170, and a first display page beginning at Line 330. Graphic animation tutorial page 12 is listed in Annex A beginning at Line 520. It includes a shortcut at Line 550 for the player to proceed directly to the game by skipping the animated tutorial.

Category page 14 begins at Line 2570 of Appendix A. It generates the category graphics that will appear in the three panels on the computer's display during the question period. A graphic for each of the above-identified five categories is generated, as well as a graphic for the wild card.

Menu page 16 begins at Line 3700 with a request for the player to activate the Caps Lock on the keyboard. This feature is to limit to twenty-six the number of alphabetic entries that can be made from the keyboard. Next, the program asks the player to select by entering y or N whether he wants sound effects, followed by a Y or N response to whether the player wants to play the advanced version of the game. In the standard version of the game the number of characters in the correct answer are shown on the display because the program presents an underscore under the blank space where each character will appear. For example, if there are two words in the correct answer and each word has four letters, the display will show four character-sized underscores followed by a space and four more character-sized underscores, with each underscore being under a blank space for its character. The advanced version does not generate the underscore and, therefore, is more difficult because it does not let the player know the number of characters and their spacing that should appear in the answer.

The menu page that beings on Line 3940 of Appendix A permits the player to select Introduction, Instructions or Play. Both Introduction and Instructions are textual presentations that are included as information for the player.

The game begins at the player page on Line 5750. The program first seeks an input from the keyboard denoting the number of players from one to six that will be participating. Then, the program asks which one of the players by number will be answering the game question that will follow. Category selection 18 is made by the player, and performed by the program beginning on Line 8060 of Appendix A.

The three panels or cards are displayed to the player during category selection. The above-identified graphics for the categories are sequentially flashed in each of the three panels in a fashion that somewhat resembles the appearance of the mechanical reels of a slot-machine when they are set spinning by operation of the machine's handle. The program's subroutine begins at Line 8210. There, the instruction is given for the subroutine to be performed twenty times. During each of the twenty cycles of the subroutine, a graphic is randomly selected to appear in the first panel, which panel is defined in Line 8240 to have its upper left corner at position $X=15$ and $Y=100$. Then, the subroutine calls for a randomly selected graphic to appear in the second panel, which is defined in Line 8270 to begin at position $X=120$ and $Y=100$. Finally, the subroutine calls for a randomly selected graphic to appear in the third panel, defined in Line 8300 to begin at position $X=225$ and $Y=100$. Accordingly, during each cycle of the subroutine the graphic of the first panel is selected, then the graphic of the second, and finally the graphic of the third; and, then the subroutine is performed again and again for a total of twenty cycles.

The category to be displayed in the first panel is randomly selected in Line 8230. There, a random (RND) integer (INT) is determined by arithmetically rounding the sum of the value one plus a random decimal from zero to one. The decimal value is a number obtained from the system's number generator that was seeded with the time of day when the computer system was turned on. If the integer is determined to be the value one, Line 8250 directs the program to go to the subroutine beginning at Line 8330 which places the graphic for Soviet People in the first panel. If the integer is the value two, the program goes to the subroutine at Line 8340 which places the graphic for Soviet Navy in the first panel. Likewise, integer values of three, four, five and six will cause the program to place the graphics for Soviet History, Other, Soviet Geography and Wildcard, respectively, in the first panel. In a like manner, the graphic for the second panel is determined at Lines 8260 and 8280; and the graphic for the third panel is determined at Lines 8290 and 8310.

Point value is accorded by the number of panels that have matching categories. For example, the point valuation of a question begins at Line 8390. If each of the three panels shows a different category and no wildcard is showing, the question is valued at fifty points for full credit. If the player effectively holds a pair by selecting s a panel having a category that matches another panel, or a wildcard is showing, the question is valued at one-hundred points for full credit by adding fifty points to the value of a single panel. If the player effectively holds three of a kind, the question is valued at one-hundred fifty points by twice adding fifty points to the value of a single panel.

Question retrieval 20 includes the question page that begins at Line 6050. First, the two data files are opened. Question.Dat is addressed to Field No.1 and sized for 128 characters. Answer.Dat is addressed to Field No. 2 and sized for a total of 128 characters; two of which are for restore, six characters that set the tolerance limit for a partially incorrect answer, 34 characters for the correct answer, and 86 characters for remarks. Each question that is retrieved advances each of the six categories to its next question, such that the player will be presented a different sequence of questions from session and will not be likely to anticipate the next question as he moves from category to category. Thereafter, the program prepares the question for display, compensates for spaces between the words of the player's answer if it is correct, provides an underscoring of the spaces for the characters in the words of a correct answer if the standard version of the game has been selected, and counts down with an hourglass graphic the time remaining for the player to enter his answer. As an alternative to the timeout process listed beginning at Line 7290, the timeout process can be linked to the system's clock.

Answer evaluation 22 includes the routine that begins at Line 7890 to process perfect answers. The program proceeds on a perfect answer to the right answer page that begins on Line 8720. If the player's answer is wrong or partially incorrect, the program reaches Lines 7940–7960 whereat it is directed to one of three subroutines as determined by the tolerance in the answer of Answer.Dat. If the tolerance has a value zero, only perfect matches between the player's answer and the answer in Answer.Dat will be given points, and an incorrect answer by the player will cause the program to go to the wrong answer page beginning at Line 9310; and, then, on the next player. If the tolerance has a value greater than one, the answer should be in numeric characters and partial credit will be given for a player's answer that does not deviate plus or minus from the numeric value of the Answer.Dat by more than the tolerance. If the tolerance has a value less than one but greater than zero, it is a decimal value that represents the percentage of characters in the player's answer that must match the characters in the answer of Answer.Dat, for the player's answer to be given partial credit. Counting the number of correct characters in the players's answers (ANS2$) compared to the characters in the answer in Answer.Dat (ANS1$), begins at Line 7970 of Appendix A. If the total collected in count is equal to, or greater than, the tolerance as determined in Line 8010, the program proceeds to the partial credit page that begins at Line 9000. In the program listed in Appendix A the player is given one-half full credit for partial answers that satisfy the tolerance requirements, and the players is credited with a correct answer for purposes of meeting the games criteria for winning.

While the invention has been described with reference to a preferred embodiment, it will be appreciated by those skilled in the art that additions, deletions, modifications, and substitutions or other changes not specified may be made which will fall within the purview of the appended claims.

APPENDIX A

```
10 CLEAR,62000!,2000
20 OPTION BASE 1
30 DIM PLAYERS(6):DIM SCORE(6):DIM WHICH(6):DIM LOCX(6):DIM LOCY(6)
40 DIM CORRECT(6,5):DIM WINNER(6):DIM USED(5,185):DIM ATTEMPT(6)
50 KEY 1,""
60 ON KEY(1) GOSUB 10430
70 KEY(1) ON
80 KEY 2,""
90 ON KEY(2) GOSUB 10440
100 KEY(2) ON
110 KEY 3 ,""
120 ON KEY(3) GOSUB 10450
130 KEY(3) ON
140 SKIP=0
150 REM DISPLAY PAGE
160 SCREEN 1,0:COLOR 4,1:CLS
170   LOCATE 3,1:PRINT "         Serious Pursuit            "
180 PLAY "T88 MB L2 O2;D;P8;L8 O1;A;L4 O2;D;L6 O1;A;L16 O1;B;L4 O2;C#;L8 O1;F#"
190 PLAY "L8 O1;F#;L4 O1;B;L6;A;L16;G;L4;A;L8;D;L8;D;L4;E;L8;E;L8;F#"
200 PLAY "L4 O1;G;L8;G;L8;A;L4;B;L8 O2;C#;L8 O2;D;L3;E;L8 O1;A;L4 O2;F#"
210   LOCATE 4,1:PRINT "         The Computer Game          "
220   LOCATE 4,1:PRINT "         The Computer Game          "
230   LOCATE 8,1:PRINT "         Developed For              "
240   LOCATE 9,1:PRINT "         Chief of Naval             "
```

```
250 LOCATE 10,1:PRINT "      Education and Training      "
260 LOCATE 13,1:PRINT "           Developed By           "
270 LOCATE 14,1:PRINT "       Navy and Marine Corps      "
280 LOCATE 15,1:PRINT "     Intelligence Training Center "
290 LOCATE 16,1:PRINT "              and                 "
300 LOCATE 17,1:PRINT "    Naval Training Systems Center "
302 REM LOCATE 20,1:PRINT "  The Federal Government is seeking  "
304 REM LOCATE 21,1:PRINT "     protection for this software.   "
310 LOCATE 23,1:PRINT "         Version 1b  3/06/90             "
320 FOR J=1 TO 38000!:NEXT J
330 REM FIRST DISPLAY PAGE
340 SCREEN 1,0:COLOR 4,0:CLS
350 LOCATE 21,14:PRINT "THE GAME OF "
360 LOCATE 23,12:PRINT "SOVIET SEAPOWER"
370 LOCATE 3,12:PRINT "SERIOUS  PURSUIT"
380 CIRCLE (195,75),40,3,4.3,1.4
390 CIRCLE (195,75),50,3,6.1,1.4,.65
400 CIRCLE (195,75),50,3,4.4,0
410 LINE (180,106)-(155,136),3:LINE -(160,140),3:LINE -(180,115),3
420 PAINT (195,115),3:PAINT (240,75),3
430 LINE (205,65)-(185,85),3:LINE -(175,75),3:LINE -(190,60),3
440 LINE -(200,60),3:LINE -(205,65),3
450 LINE (200,70)-(260,130),3:LINE -(250,140),3:LINE -(190,80),3
460 PAINT (193,75),3:PAINT (197,75),3:PAINT (258,130),3
470 LINE (95,45)-(85,80),3:LINE -(45,80),3:LINE -(80,95),3
480 LINE (95,45)-(105,80),3:LINE -(145,80),3:LINE -(110,95),3
490 LINE (80,95)-(65,140),3:LINE -(95,105),3
500 LINE -(125,140),3:LINE -(110,95),3:PAINT (95,75),3
510 FOR J=1 TO 29000:NEXT
520 REM GRAPHIC ANIMATION
530 REM LEADERS
540 SCREEN 1:COLOR 4,0:CLS
550 LOCATE 23,4:PRINT "PRESS F3 TO SKIP THE ANIMATION"
560 IF SKIP=1 THEN GOTO 2560
570 CIRCLE (171,150),80,,0,.55
580 CIRCLE (290,115),50,,1.57,3.2,.8
590 CIRCLE (290,115),40,,.4,1.57,2
600 CIRCLE (303,80),80,,4.3,4.8,.8
610 CIRCLE (295,100),4,,,,.4
620 LINE (305,100)-(315,120):LINE -(308,122)
630 CIRCLE (298,140),15,,5.7,.5,.5
640 LINE (310,135)-(305,120)
650 CIRCLE (270,115),8,,1,5.4,1.5
660 CIRCLE (295,100),8,,.6,2.5,.6
670 CIRCLE (295,99),8,,.6,2.5,.6
680 CIRCLE (310,120),20,,4,4.6,.5
690 CIRCLE (310,117),20,,4,4.7,.9
700 CIRCLE (300,130),60,,1.5,2,.7
710 CIRCLE (365,131),80,,3.3,3.5
720 CIRCLE (325,145),80,,2.2,2.9
730 PAINT (245,120),3
740 IF SKIP=1 THEN GOTO 2560
750 LOCATE 2,1:PRINT "SOVIET LEADERS"
760 FOR J=1 TO 6000:NEXT J
770 PLAY "L6 O2;E;L16;D;L4;E;L8;C#;L8 O1;A;L4 O2;D;L6 O2;C#;L16 O1;B
780 PLAY "L4 O2;C#;L8 O1;F#;F#;L4;B;L8;A;L8;G
790 PLAY "L4 O1;A;L8;D;D;L4 O2;D;L6 O2;C#;L16 O1;B;L8 O1;A;L8 O2;C#;L8 O2;D
800 COLOR 4,1:LOCATE 5,1:PRINT "LENIN 1917-1924":LOCATE 6,1:PRINT "(VLADIMIR ILICH ULYANOV)":FOR J=1 TO 6000:NEXT J
810 IF SKIP=1 THEN GOTO 2560
820 COLOR 4,0:LOCATE 8,1:PRINT "JOSEPH STALIN 1924-1953":FOR J=1 TO 6000:NEXT J
830 IF SKIP=1 THEN GOTO 2560
840 COLOR 4,1:LOCATE 10,1:PRINT "NIKITA KHRUSHCHEV 1953-1964":FOR J=1 TO 6000:NEXT J
850 IF SKIP=1 THEN GOTO 2560
860 COLOR 4,0:LOCATE 12,1:PRINT "LEONID BREZHNEV 1964-1982":FOR J=1 TO 6000:NEXT J
870 IF SKIP=1 THEN GOTO 2560
880 COLOR 4,1:LOCATE 14,1:PRINT "YURI ANDROPOV 1983-1984":FOR J=1 TO 6000:NEXT J
890 IF SKIP=1 THEN GOTO 2560
900 COLOR 4,0:LOCATE 16,1:PRINT "KONSTANIN CHERNENKO 1984-1985":FOR J=1 TO 6000:NEXT J
910 IF SKIP=1 THEN GOTO 2560
920 COLOR 4,1:LOCATE 18,1:PRINT "MIKHAIL GORBACHEV 1985-":FOR J=1 TO 6000:NEXT J
930 IF SKIP=1 THEN GOTO 2560
940 FOR J=1 TO 6000:NEXT J
950 REM
960 IF SKIP=1 THEN GOTO 2560
970 CLS:SCREEN 1:COLOR 1,1
980 LOCATE 1,10:PRINT "SOVIET ASSAULT WEAPONS"
```

```
990  LINE (46,110)-(0,110):LINE -(0,119):LINE -(15,113):LINE -(46,113)
1000 LINE -(46,112):LINE -(49,112):LINE -(49,111):LINE -(46,111):LINE -(46,110)
1010 CIRCLE (17,114),2,,3.14,6.28
1020 LINE (20,110)-(20,107):LINE -(30,107):LINE -(30,110)
1030 PAINT (20,112),3
1040 FOR J=1 TO 500:NEXT J
1050 LINE (53,111)-(51,111),1:LINE (53,112)-(51,112),1
1060 DIM BULLET#(1)
1070 GET (51,111)-(53,112),BULLET#
1080 FOR J=1 TO 300:NEXT J
1090 PUT (51,111),BULLET#
1100 PLAY "L8;E;L2;F#;L8;E;L8;D;L8;C#;L8;D;L3;E;L8 O1;A;A;L8 O2;C#;L8 O2;D
1110 FOR J=60 TO 310 STEP 10
1120     IF J=90 THEN LOCATE 10,10:PRINT "AK-47"
1130     IF J=170 THEN LOCATE 18,20:PRINT "RPG-7"
1140     IF J=170 THEN LOCATE 20,10:PRINT "ROCKET PROPELLED GRENADE"
1150     IF J=260 THEN LOCATE 10,30:PRINT "AK-74"
1160     PUT (J,111),BULLET#
1170     FOR K=1 TO 500:NEXT K
1180     PUT (J,111),BULLET#
1190 NEXT J
1200 PLAY "L8 O2;E;L2 O2;D;L8 O2;C#;L8 O1;B;A;B;L3 O2;C#;L8 O1;F#;F#;A;B;L8 O2;C#"
1210 PLAY "L4 O2;D;L6 O1;B;L16 O2;C#;L4;D;L6 O1;B;L16 O2;C#;L4 O2;D;L8 O1;B"
1220 FOR J=1 TO 5000:NEXT J
1230 REM RUSSIAN BATTLES
1240 IF SKIP=1 THEN GOTO 2560
1250 CLS:SCREEN 1:COLOR 4,1
1260 LOCATE 1,13:PRINT "RUSSIAN BATTLES"
1270 PI=3.1416
1280 CIRCLE (10,140),10,,.7*PI,1.7*PI
1290 CIRCLE (45,125),4,,,,2
1300 LINE (5,133)-(45,121):LINE (12,148)-(45,129):PAINT (10,140),3
1310 CIRCLE (12,148),10,2:LINE (5,141)-(19,155),2:LINE (19,141)-(5,155),2
1320 CIRCLE (52,125),4,1:PAINT(52,125),1:DIM BALL#(4)
1330 GET (48,121)-(56,129),BALL#:PUT (48,121),BALL#
1340 FOR J=0 TO 31400 STEP 628
1350     IF J=6280 THEN LOCATE 12,1:PRINT "THE BATTLE":LOCATE 13,1:PRINT "OF POLTAVA"
1360     IF J=15700 THEN LOCATE 8,4:PRINT "THE BATTLE OF THE TSUSHIMA STRAITS"
1370     IF J=15700 THEN LOCATE 11,15:PRINT "THE BATTLE"
1380     IF J=15700 THEN LOCATE 12,14:PRINT "OF MOON SOUND"
1390     IF J=25120 THEN LOCATE 12,31:PRINT "THE BATTLE":LOCATE 13,33:PRINT "OF SINOP"
1400     CANX=52+70*(J/10000)::CANY=115-50*SIN(J/10000)
1410     PUT (CANX,CANY),BALL#
1420     FOR K=1 TO 600:NEXT K
1430     PUT (CANX,CANY),BALL#
1440 NEXT J
1450 FOR J=1 TO 5000:NEXT J
1460 REM
1470 REM SOVIET GEOGRAPHY
1480 REM
1490 IF SKIP=1 THEN GOTO 2560
1500 CLS:SCREEN 1:COLOR 0,1
1510 LOCATE 1,13:PRINT "SOVIET GEOGRAPHY"
1520 LINE (130,105)-(145,110):LINE -(160,105)
1530 LINE (130,105)-(133,100):LINE -(131,99):LINE -(129,103)
1540 LINE -(128,100):LINE -(129,97):LINE -(127,92):LINE -(134,85)
1550 LINE -(137,86):LINE -(142,83):LINE -(141,87):LINE -(145,88)
1560 LINE -(148,89):LINE -(151,90):LINE -(149,92):LINE -(153,92)
1570 LINE -(153,90):LINE -(155,88):LINE -(155,90):LINE -(157,90)
1580 LINE -(157,88):LINE -(162,85):LINE -(162,88):LINE -(169,88)
1590 PSET (169,87):PSET (168,86):LINE -(173,83):LINE -(175,81)
1600 LINE -(183,94):LINE -(182,95):LINE -(176,89):LINE -(176,91)
1610 LINE -(174,101):PSET (175,101):PSET (176,100):PSET (177,101)
1620 LINE -(176,109):PSET (175,109):LINE -(175,104):LINE -(172,104)
1630 LINE -(170,102):LINE -(168,102):LINE -(167,106):LINE -(160,105)
1640 PAINT (150,95)
1650 LOCATE 20,16:PRINT "CASPIAN SEA"
1660 LOCATE 16,5:PRINT "BLACK SEA"
1670 LOCATE 13,3:PRINT "KIEV"
1680 LOCATE 10,5:PRINT "BALTIC SEA"
1690 LOCATE 6,17:PRINT "MOSCOW"
1700 LOCATE 10,25:PRINT "PETROPAVLOVSK"
1710 LOCATE 13,27:PRINT "SEA OF OKHOTSK"
1720 LOCATE 16,25:PRINT "VLADIVOSTOK"
1730 LINE (141,150)-(140,146),2
1740 FOR J=1 TO 11
```

```
1750    LINE -(141-J,150-INT(4.3*J)),2:FOR K=1 TO 300:NEXT K
1760 NEXT J
1770 LINE (100,120)-(101,120),2
1780 FOR J=1 TO 26
1790    LINE -(100+J,120-INT(.731*J)),2:FOR K=1 TO 200:NEXT K
1800 NEXT J
1810 LINE (48,98)-(49,98),2
1820 FOR J=1 TO 83 STEP 2
1830    LINE -(48+J,98),2:FOR K=1 TO 100:NEXT K
1840 NEXT J
1850 LINE (110,80)-(111,80),2
1860 FOR J=1 TO 19
1870    LINE -(110+J,80+INT(.444*J)),2:FOR K=1 TO 200:NEXT K
1880 NEXT J
1890 LINE (140,50)-(140,51),2
1900 FOR J=1 TO 45 STEP 2
1910    LINE -(140-INT(J/9),50+J),2:FOR K=1 TO 200:NEXT K
1920 NEXT J
1930 LINE (200,80)-(199,81),2
1940 FOR J=1 TO 18
1950    LINE -(200-J,80+INT(J*.722)),2:FOR K=1 TO 200:NEXT K
1960 NEXT J
1970 LINE (206,98)-(205,98),2
1980 FOR J=1 TO 26
1990    LINE -(206-J,98),2:FOR K=1 TO 100:NEXT K
2000 NEXT J
2010 LINE (190,123)-(189,122),2
2020 FOR J=1 TO 14
2030    LINE -(190-J,123-J),2:FOR K=1 TO 200:NEXT K
2040 NEXT J
2050 FOR J=1 TO 2000:NEXT J
2060 REM
2070 REM SOVIET AIRCRAFT
2080 REM
2090 PLAY "L8 O2;D;L2;G;G;L8;F#;E;D;E;L3;F#;L8;D;L2;D;L2;E;L8;D;L8;C#;L8 O1;B;L8 O2;C#
2100 PLAY "L3 O2;D;L8 O1;B;L2;B;L4 O2;D;L8 O2;C#;L8 O1;B;L4;A;L6;D;L16;D;L2;A;L4;B;L4 O2;C#;L1;D
2110 IF SKIP=1 THEN GOTO 2560
2120 CLS:SCREEN 1:COLOR 1,1
2130 LOCATE 1,13:PRINT "SOVIET AIRCRAFT"
2140 LINE (0,85)-(5,100):LINE -(30,100):LINE -(40,105):LINE -(0,105):LINE -(0,85)
2150 PAINT (5,101),3:DIM JET#(57)
2160 GET (0,80)-(40,120),JET#
2170 LOCATE 3,1:PRINT "B-BOMBER":LOCATE 3,16:PRINT "H-HELOS":LOCATE 3,32:PRINT "F-FIGHTER":LOCATE 16,1:PRINT "M-ASW/AEW":LOCATE 16,13
2180 FOR J=1 TO 7000:NEXT J
2190 PUT (0,80),JET#
2200 FOR J=0 TO 270 STEP 10
2210 IF J=20 THEN LOCATE 5,1:PRINT "BADGER":LOCATE 7,1:PRINT "BEAR":LOCATE 9,1:PRINT "BACKFIRE":LOCATE 18,1:PRINT "MAINSTAY":LOCATE 2
2220 IF J=120 THEN LOCATE 5,16:PRINT "HAZE":LOCATE 7,16:PRINT "HORMONE":LOCATE 9,16:PRINT "HELIX":LOCATE 18,16:PRINT "CONDOR":LOCATE
2230 IF J=250 THEN LOCATE 5,32:PRINT "FARMER":LOCATE 7,32:PRINT "FISHBED":LOCATE 9,32:PRINT "FLOGGER":LOCATE 16,32:PRINT "FOXBAT":LOC
2240    PUT (J,80),JET#
2250    FOR K=1 TO 600:NEXT K
2260    PUT (J,80),JET#
2270 NEXT J
2280 FOR J=1 TO 2000:NEXT J
2290 REM
2300 REM SOVIET MISSILES
2310 REM
2320 CLS:SCREEN 1:COLOR 1,1
2330 LINE (1,180)-(9,192):LINE -(14,183):LINE -(32,173):LINE -(33,171)
2340 LINE -(29,171):LINE (1,180)-(11,180):LINE -(29,171):PAINT (5,185),3
2350 LOCATE 1,1:PRINT "SOVIET MISSILES"
2360 LOCATE 3,1:PRINT "SS - SURFACE TO SURFACE"
2370 LOCATE 5,1:PRINT "SA - SURFACE TO AIR"
2380 LOCATE 7,1:PRINT "AS - AIR TO SURFACE"
2390 LOCATE 9,1:PRINT "AA - AIR TO AIR"
2400 DIM MISS#(57):GET (0,160)-(40,195),MISS#
2410 FOR J=1 TO 5000:NEXT J
2420 PUT (0,160),MISS#
2430 TRACK=3400
2440 FOR J=10 TO 270 STEP 10
2450    PUT (J,160-(J/2)),MISS#
2460    IF J=20 THEN LOCATE 23,8:PRINT "SA-6 GAINFUL"
2470    IF J=50 THEN LOCATE 20,13:PRINT "ANTI-SHIP CRUISE MISSILES"
2480    IF J=100 THEN LOCATE 17,19:PRINT "AS-4 KITCHEN"
2490    IF J=150 THEN LOCATE 14,25:PRINT "AS-3 KANGAROO"
2500    IF J=200 THEN LOCATE 11,30:PRINT "SA-7 GRAIL"
```

```
2510     FOR K=1 TO TRACK:NEXT K
2520     PUT (J,160-(J/2)),MISS#
2530     TRACK=TRACK-200
2540 NEXT J
2550 FOR J=1 TO 5000:NEXT J
2560 REM
2570 REM CATAGORY PAGE
2580 REM
2590 SCREEN 1:COLOR 0,1:CLS
2600 LOCATE 1,15:PRINT "CATEGORIES"
2610 LINE (16,10)-(96,90),1,B
2620 LOCATE 3,5:PRINT "SOVIET"
2630 LOCATE 11,5:PRINT "PEOPLE"
2640 CIRCLE (30,30),4
2650 LINE (29,34)-(29,35):LINE (31,34)-(31,35)
2660 PSET (28,35):PSET(27,35):PSET(26,36):PSET(25,37)
2670 PSET (32,35):PSET(33,35):PSET(34,36):PSET(35,37)
2680 LINE (25,37)-(25,41):PSET (26,41):PSET(27,41)
2690 LINE (35,37)-(35,41):PSET(34,41):PSET(33,41)
2700 LINE (27,48)-(33,48)
2710 PAINT (30,30)
2720 LINE (27,41)-(27,48):LINE (33,41)-(33,48)
2730 PAINT (30,37)
2740 LINE (30,43)-(30,48),0
2750 PSET(28,29),0:PSET(32,29),0:PSET(30,30),0
2760 PSET(29,32),0:PSET(30,32),0:PSET(31,32),0
2770 LINE (26,38)-(26,41),0:LINE (34,38)-(34,41),0
2780 DIM PEO#(10)
2790 GET (25,26)-(35,48),PEO#
2800 PUT (50,26),PEO#:PUT (74,26),PEO#
2810 PUT (38,55),PEO#:PUT (62,55),PEO#
2820 DIM PEOPLE#(214)
2830 GET (16,10)-(96,90),PEOPLE#
2840 LINE (112,10)-(192,90),1,B
2850 LOCATE 3,17:PRINT "SOVIET"
2860 LOCATE 11,18:PRINT "NAVY"
2870 CIRCLE (152,5),70,3,4.3,5.1
2880 CIRCLE (127,53),10,3,1.57,4.71,.5
2890 CIRCLE (177,53),10,3,4.71,1.57,.5
2900 LINE (127,48)-(137,48):LINE -(137,38):LINE -(152,38)
2910 LINE -(152,48):LINE -(177,48)
2920 PAINT (152,53),3
2930 LINE (140,38)-(140,33):LINE (149,38)-(149,33)
2940 DIM NAVY#(214)
2950 GET (112,10)-(192,90),NAVY#
2960 LINE (208,10)-(288,90),1,B
2970 LOCATE 3,29:PRINT "SOVIET"
2980 LOCATE 11,29:PRINT "HISTORY"
2990 LINE (246,33)-(241,48):LINE -(228,48):LINE -(241,53):LINE -(235,68)
3000 LINE -(246,58):LINE -(256,68):LINE -(251,53):LINE -(264,48)
3010 LINE -(251,48):LINE -(246,33)
3020 PAINT (246,48),3
3030 DIM HIST#(214)
3040 GET (208,10)-(288,90),HIST#
3050 LINE (18,106)-(98,186),1,B
3060 LOCATE 15,4:PRINT "THE OTHER"
3070 LOCATE 23,4:PRINT "SERVICES"
3080 LINE (38,126)-(84,126):LINE -(84,127):LINE -(87,127):LINE -(87,128)
3090 LINE -(84,128):LINE -(84,129):LINE -(53,129):LINE -(38,135)
3100 LINE -(38,126):PAINT (58,127):CIRCLE (55,130),2,,3.14,6.28
3110 CIRCLE (73,129),10,,3.14,4.1
3120 CIRCLE (74,129),10,,3.14,4.1
3130 CIRCLE (75,129),10,,3.14,4.1
3140 CIRCLE (76,129),10,,3.14,4.1
3150 LINE (30,146)-(35,161):LINE -(60,161):LINE -(70,166):LINE -(30,166)
3160 LINE -(30,146):PAINT (50,163),3
3170 DIM OTHER#(214)
3180 GET (18,106)-(98,186),OTHER#
3190 LINE (114,106)-(194,186),1,B
3200 LOCATE 15,17:PRINT "SOVIET"
3210 LOCATE 23,16:PRINT "GEOGRAPHY"
3220 LINE (130,155)-(145,160):LINE -(160,155)
3230 LINE (130,155)-(133,150):LINE -(131,149):LINE -(129,153)
3240 LINE -(128,150):LINE -(129,147):LINE -(127,142):LINE -(134,135)
3250 LINE -(137,136):LINE -(142,133):LINE -(141,137):LINE -(145,138)
3260 LINE -(148,139):LINE -(151,140):LINE -(149,142):LINE -(153,142)
```

```
3270 LINE -(153,140):LINE -(155,138):LINE -(155,140):LINE -(157,140)
3280 LINE -(157,138):LINE -(162,135):LINE -(162,138):LINE -(169,138)
3290 PSET (169,137):PSET (168,136):LINE -(173,133):LINE -(175,131)
3300 LINE -(177,131):LINE -(177,133):LINE -(179,135):LINE -(179,138)
3310 LINE -(183,144):LINE -(182,145):LINE -(176,139):LINE -(176,141)
3320 LINE -(174,151):PSET (175,151):PSET (176,150):PSET (177,151)
3330 LINE -(176,159):PSET (175,159):LINE -(175,154):LINE -(172,154)
3340 LINE -(170,152):LINE -(168,152):LINE -(167,156):LINE -(160,155)
3350 PAINT (150,145)
3360 DIM GEO#(214)
3370 GET (114,106)-(194,186),GEO#
3380 LINE (208,106)-(288,186),1,B
3390 LOCATE 15,30:PRINT "WILD"
3400 LOCATE 23,30:PRINT "CARD"
3410 CIRCLE (238,146),20,2,4.4,1.4
3420 CIRCLE (238,146),23,2,4.4,1.4,.8
3430 LINE (233,162)-(228,171),2:LINE -(230,173),2:LINE -(235,164),2
3440 PAINT (259,146),2:PAINT (229,171),2
3450 LINE (231,146)-(238,139),2:LINE -(242,139),2:LINE -(244,141),2
3460 LINE -(236,149),2:LINE -(231,146),2
3470 LINE (241,144)-(266,169),2:LINE -(264,171),2:LINE -(239,146),2
3480 PAINT (238,140),2:PAINT (241,145),2:PAINT (264,170),2
3490 DIM WILD#(214)
3500 GET (208,106)-(288,186),WILD#
3510 LOCX(1)=16:LOCX(2)=112:LOCX(3)=208
3520 LOCX(6)=16:LOCX(5)=112:LOCX(4)=208
3530 LOCY(1)=10:LOCY(2)=10:LOCY(3)=10
3540 LOCY(6)=106:LOCY(5)=106:LOCY(4)=106
3550 A=0:B=1:C=2:D=5:E=4:F=3
3560 FOR J=2 TO 7
3570    IF A+J > 6 THEN A=A-6
3580    IF B+J > 6 THEN B=B-6
3590    IF C+J > 6 THEN C=C-6
3600    IF D+J > 6 THEN D=D-6
3610    IF E+J > 6 THEN E=E-6
3620    IF F+J > 6 THEN F=F-6
3630    LINE (0,10)-(300,190),0,BF
3640    PUT (LOCX(A+J),LOCY(A+J)),PEOPLE#:PUT (LOCX(B+J),LOCY(B+J)),NAVY#
3650    PUT (LOCX(C+J),LOCY(C+J)),HIST#:PUT (LOCX(D+J),LOCY(D+J)),OTHER#
3660    PUT (LOCX(E+J),LOCY(E+J)),GEO#:PUT (LOCX(F+J),LOCY(F+J)),WILD#
3670    FOR K=1 TO 2300:NEXT
3680 NEXT J
3690 FOR K=1 TO 35000!:NEXT
3700 REM
3710 REM CAPS LOCK PAGE
3720 REM
3730 KEY 15,CHR$(&H40)+CHR$(58)
3740 KEY (15) ON
3750 SCREEN 1,0:COLOR 0,1:CLS
3760 SOUNDON=0
3770 LOCATE 2,12:PRINT "Turn CAPS LOCK on"
3780 LOCATE 6,11:PRINT "Do you want to play"
3790 LOCATE 7,10:PRINT "with sound? (Y or N)"
3800 PLAY "T120"
3810 DUMMY$=INPUT$(1)
3820 IF DUMMY$<>"Y" AND DUMMY$<>"N" THEN GOTO 3810
3830 IF DUMMY$="Y" THEN SOUNDON=1
3840 LOCATE 12,1:PRINT "     The advanced version of this"
3850 LOCATE 13,1:PRINT "     game does not underscore the"
3860 LOCATE 14,1:PRINT "     position dependent characters"
3865 LOCATE 15,1:PRINT "     in the answer."
3870 LOCATE 18,1:PRINT "     Would you like to play the "
3880 LOCATE 19,1:PRINT "     advanced version? (Y or N)"
3890 DUMMY$=INPUT$(1)
3900 IF DUMMY$<>"Y" AND DUMMY$<>"N" THEN GOTO 3870
3910 IF DUMMY$="Y" THEN ADVANCE=1 ELSE ADVANCE=0
3920 REM
3930 REM
3940 REM MENU PAGE
3950 REM
3960 SCREEN 1,0:COLOR 0,1:CLS
3970 LOCATE 2,15:PRINT "MAIN MENU"
3980 LINE (40,40)-(280,160),2,B
3990 LINE (30,30)-(290,170),2,B
4000 PAINT (35,35),2
4010 LOCATE 9,8:PRINT "1) Introduction"
```

```
4020 LOCATE 13,8:PRINT "2) Instructions"
4030 LOCATE 17,8:PRINT "3) Play Serious Pursuit"
4040 LOCATE 23,15:PRINT "SELECTION"
4050 SELECT$=INPUT$(1)
4060 SELECT=VAL(SELECT$)
4070 IF SELECT <> 1 AND SELECT <> 2 AND SELECT <> 3 THEN GOTO 4050
4080 IF SELECT = 3 GOTO 5740
4090 IF SELECT = 2 GOTO 4600
4100 IF SELECT = 1 GOTO 4110
4110 REM
4120 REM INTRODUCTION PAGE
4130 REM
4140 SCREEN 2:CLS
4150 A$=INKEY$
4160 IF A$=CHR$(13) OR A$="" GOTO 4170
4170 PRINT " "
4180 PRINT "                           INTRODUCTION:           "
4190 PRINT " "
4200 PRINT " "
4210 PRINT "    What do you know about the Soviet Union? You are about to find out.  "
4220 PRINT "  This game is called SERIOUS PURSUIT-THE GAME OF SOVIET SEAPOWER. It"
4230 PRINT "  draws its questions from the following five categories:"
4240 PRINT " "
4250 PRINT " "
4260 PRINT "                    SOVIET GEOGRAPHY           "
4270 PRINT " "
4280 PRINT "                    SOVIET PEOPLE              "
4290 PRINT " "
4300 PRINT "                    SOVIET HISTORY             "
4310 PRINT " "
4315 PRINT "                    THE SOVIET NAVY            "
4316 PRINT " "
4320 PRINT "                    THE OTHER FOUR ARMED SERVICES"
4350 LOCATE 22,25:PRINT "Press any key to continue"
4360 LOCATE 22,50:DUMMY$=INPUT$(1)
4370 CLS
4430 PRINT "   The basis of this game is an understanding of the Soviet Union through"
4440 PRINT " "
4450 PRINT "  its history, personalities, capabilities and its allies. Soviet seapower is"
4460 PRINT " "
4470 PRINT "  more than just ships, aircraft and doctrine. It is centered around the"
4480 PRINT " "
4490 PRINT "  men. This game will provide you with an understanding of these sailors."
4500 PRINT " "
4510 PRINT "  In addition to this understanding, the game is just pure fun, but remember,"
4520 PRINT " "
4530 PRINT "  this is SERIOUS PURSUIT. There is nothing trivial about the Soviet Navy."
4540 PRINT " "
4550 PRINT "  They are our greatest maritime adversary."
4552 PRINT " "
4554 PRINT " This product was produced by the Naval Training Systems Center for use by the"
4556 PRINT " "
4558 PRINT " U.S. Government, and is suitable for its purposes. All responsibility for the"
4560 PRINT " "
4562 PRINT " media, program(s), and information contained herein, is disclaimed with"
4564 PRINT " "
4566 PRINT " respect to any use by others. All rights are reserved."
4592 LOCATE 23,15:PRINT "Press any key to return to the menu screen "
4594 LOCATE 23,57:DUMMY$=INPUT$(1)
4596 GOTO 3920
4598 REM
4600 REM INSTRUCTION PAGE
4610 REM
4620 SCREEN 2:CLS
4630 A$=INKEY$
4640 IF A$=CHR$(13) OR A$="" GOTO 4650
4650 PRINT " "
4660 PRINT "                           INSTRUCTIONS"
4670 PRINT " "
4680 PRINT "   Serious Pursuit the Computer Game has 185 different questions in each"
4690 PRINT ""
4700 PRINT " of the five categories.                   "
4710 PRINT ""
4720 PRINT "   The game will start after you enter the players' names. On the category"
4730 PRINT " "
4740 PRINT " page you will be able to select one of the following five categories:"
```

```
4750 PRINT " "
4760 PRINT "                         SOVIET GEOGRAPHY "
4770 PRINT " "
4780 PRINT "                         SOVIET PEOPLE"
4790 PRINT " "
4800 PRINT "                         SOVIET HISTORY"
4810 PRINT " "
4815 PRINT "                         THE SOVIET NAVY"
4816 PRINT " "
4820 PRINT "                         THE OTHER FOUR ARMED SERVICES"
4850 LOCATE 23,25:PRINT "Press any key to continue"
4860 LOCATE 22,50:DUMMY$=INPUT$(1)
4870 SCREEN 2:CLS
4880 PRINT " "
4890 PRINT "    The wild card will match any selection picked. The value of the"
4900 PRINT " "
4910 PRINT "           question will depend on how many matches you have."
4920 PRINT " "
4930 PRINT " "
4940 PRINT "                  ONE OF A KIND -  50 POINTS"
4950 PRINT " "
4960 PRINT "                  TWO OF A KIND - 100 POINTS"
4970 PRINT " "
4980 PRINT "                  THREE OF A KIND - 150 POINTS"
4990 PRINT " "
5000 PRINT " "
5010 PRINT " After you enter your desired category, a question from that category"
5020 PRINT " "
5030 PRINT " will be displayed on the question page. You have three minutes (180 seconds)"
5040 PRINT " "
5050 PRINT " to answer each question. At the end of the three minutes the program"
5060 PRINT " "
5070 PRINT " will evaluate all the characters that have been entered."
5080 PRINT " "
5090 LOCATE 23,25:PRINT "Press any key to continue"
5100 DUMMY$=INPUT$(1)
5110 SCREEN 2:CLS
5120 PRINT " "
5130 PRINT " "
5140 PRINT " Type your answer above the arrow cursor. The left arrow, right arrow and"
5150 PRINT " "
5160 PRINT " back space keys are supported to aid you in editing your answer. The"
5170 PRINT ""
5180 PRINT " number of characters in the answer will correspond to the number of dashed"
5190 PRINT ""
5200 PRINT " lines displayed. If the number of characters in an answer would give"
5210 PRINT " "
5220 PRINT " away the answer (i.e. true or false), the dashed lines will not be displayed."
5230 PRINT " "
5240 PRINT " T or F may be used for a true or false answer. Any slash, hyphen, apostrophe,"
5250 PRINT " "
5260 PRINT " or period in the answer will be displayed and automatically entered"
5270 PRINT " "
5280 PRINT " in your answer. Press enter after you have finished typing your answer."
5290 PRINT " "
5300 PRINT " In the advanced version of this game no punctuation or underscores will be"
5310 PRINT " "
5320 PRINT " displayed and you must enter all required punctuation."
5330 PRINT " "
5340 LOCATE 23,25:PRINT "Press any key to continue"
5350 DUMMY$=INPUT$(1)
5360 SCREEN 2:CLS
5370 PRINT " "
5380 PRINT " You will receive the question's full value for a correct answer."
5390 PRINT " "
5400 PRINT " You will receive 50% of the question's value if you have at least 60% of your"
5410 PRINT " "
5420 PRINT " position dependent characters entered correctly."
5430 PRINT " "
5440 PRINT "  To win the game you must score at least 1500 points and have correctly"
5450 PRINT " "
5460 PRINT " answered two questions from each of the five categories. The determination"
5470 PRINT " "
5480 PRINT " of a winner is made at the end of each round (when the game status is "
5490 PRINT " "
5500 PRINT " displayed). In case of a tie, the game will continue for the players who"
```

```
5510 PRINT " "
5520 PRINT " have met the game winning criteria, until one player has the highest"
5530 PRINT " "
5540 PRINT " score at the end of the round."
5550 PRINT " "
5560 LOCATE 23,25:PRINT "Press any key to continue"
5570 DUMMY$=INPUT$(1)
5580 SCREEN 2:CLS
5590 PRINT ""
5600 PRINT ""
5610 PRINT "   The game status page will be displayed at the end of each round. To check"
5620 PRINT ""
5630 PRINT " the game status in the middle of a round, press F2 and the the game status"
5640 PRINT ""
5650 PRINT " page will be displayed before the next question is displayed. To quit the"
5660 PRINT ""
5670 PRINT " game before a winner has been determined, press F1 and then Q."
5680 PRINT ""
5690 PRINT ""
5700 PRINT "   Now enjoy Serious Pursuit."
5710 LOCATE 23,18:PRINT "Press any key to return to the main menu"
5720 DUMMY$=INPUT$(1)
5730 GOTO 3920
5740 REM
5750 REM ENTER THE PLAYER PAGE
5760 REM
5770 FOR J=1 TO 5
5780    FOR K=1 TO 185
5790          USED(J,K)=0
5800    NEXT K
5810 NEXT J
5820 SCREEN 1,0:COLOR 0,1:CLS
5830 A$=INKEY$
5840 IF A$=CHR$(13) OR A$="" GOTO 5850
5850 LINE (20,15)-(280,55),1,B
5860 LINE (10,5)-(290,65),1,B
5870 PAINT (15,10),1
5880 LINE (20,65)-(280,180),1,B
5890 LINE (10,55)-(290,190),1,B
5900 PAINT (15,66),1
5910 LOCATE 4,10:PRINT "Enter the number of"
5920 LOCATE 6,10:PRINT "players (1 to 6)"
5930 PLAYNUM$=INPUT$(1)
5940 PLAYNUM=VAL(PLAYNUM$)
5950 LOCATE 6,27:PRINT PLAYNUM
5960 IF PLAYNUM <> 1 AND PLAYNUM <> 2 AND PLAYNUM <> 3 AND PLAYNUM <> 4
AND PLAYNUM <> 5 AND PLAYNUM <>6 THEN GOTO 5930
5970 LOCATE 10,12:PRINT "PLAYER'S NAMES:"
5980 A$=INKEY$
5990 IF A$=CHR$(13) OR A$="" GOTO 6000
6000 FOR J=1 TO PLAYNUM
6010    LOCATE ((J*2)+10),8:PRINT "Enter player";J
6020    LOCATE ((J*2)+10),23:INPUT PLAYERS(J)
6030 NEXT J
6040 REM
6050 REM QUESTION PAGE
6060 REM
6070 OPEN "R",#1,"QUESTION.DAT"
6080 OPEN "R",#2,"ANSWER.DAT"
6090 FIELD #1, 128 AS QUES
6100 FIELD #2,2 AS RES$,6 AS TOL$,34 AS ANS$,86 AS REMARK$
6110 FOR J=1 TO PLAYNUM
6120    SCORE(J)=0
6130 NEXT J
6140 FOR J=1 TO PLAYNUM
6150    ATTEMPT(J)=0
6160    FOR K=1 TO 5
6170          CORRECT(J,K)=0
6180    NEXT K
6190 NEXT J
6200 FINISHED=0
6210 ZTIME=60*VAL(MID$(TIME$,4,2))+VAL(MID$(TIME$,7,2))
6220 RANDOMIZE ZTIME
6230 START=INT(RND*185)+1
6240 NUM=START
6250 ENDQ=1000
```

```
6260 ENDP=PLAYNUM
6270 STARTQ=1
6280 STATUS=0
6290 FOR QUSNUM=STARTQ TO ENDQ
6300 GOSUB 9590
6310 FOR PLAYER=1 TO ENDP
6320 IF CHECK=1 THEN GOSUB 9590
6330 GOSUB 8060
6340 IF CHECK=1 THEN GOSUB 9590
6350 ATTEMPT(PLAYER)=ATTEMPT(PLAYER)+1
6360 COUNT=0
6370 NUM=NUM+1
6380 IF NUM > 185 THEN NUM = 1
6390 COUNT=COUNT+1
6400 IF COUNT >= 185 THEN FOR J=1 TO 185:USED(WHICH(SELECT),J)=0:NEXT J:GOTO 6360
6410 IF USED(WHICH(SELECT),NUM)=1 THEN GOTO 6370
6420 USED(WHICH(SELECT),NUM)=1
6430 SCREEN 1:COLOR 0,1:CLS
6440 LOCATE 3,3:PRINT "PLAYER":LOCATE 4,3:PRINT PLAYER$(PLAYER)
6450 LOCATE 3,15:PRINT "ROUND":LOCATE 4,14:PRINT QUSNUM
6460 LOCATE 7,3:PRINT "SCORE":LOCATE 8,2:PRINT SCORE(PLAYER)
6470 LOCATE 7,15:PRINT "VALUE":LOCATE 8,14:PRINT VALUE
6480 ON WHICH(SELECT) GOSUB 6500,6510,6520,6530,6540,6550
6490 GOTO 6560
6500 PUT(220,0),PEOPLE#:RETURN
6510 PUT(220,0),NAVY#:RETURN
6520 PUT(220,0),HIST#:RETURN
6530 PUT(220,0),OTHER#:RETURN
6540 PUT(220,0),GEO#:RETURN
6550 PUT(220,0),WILD#:RETURN
6560 LINE (4,4)-(110,44),2,B:LINE (12,12)-(102,36),2,B:PAINT (50,8),2
6570 LINE (102,4)-(210,44),2,B:LINE (110,12)-(202,36),2,B:PAINT (150,8),2
6580 LINE (4,36)-(110,76),2,B:LINE (12,44)-(102,68),2,B:PAINT (8,50),2
6590 LINE (102,36)-(210,76),2,B:LINE (110,44)-(202,68),2,B:PAINT (206,50),2
6600 IF WHICH(SELECT)=1 THEN OFFSET=740
6610 IF WHICH(SELECT)=2 THEN OFFSET=0
6620 IF WHICH(SELECT)=3 THEN OFFSET=370
6630 IF WHICH(SELECT)=4 THEN OFFSET=185
6640 IF WHICH(SELECT)=5 THEN OFFSET=555
6650 GET #1,OFFSET+NUM
66      #2,OFFSET+NUM
667.    CE=1
6680 LENGTH=130
6690 QUES$=STRING$(130,32)
6700 MID$(QUES$,1)=QUE$
6710 FOR J=12 TO 20
6720    IF PLACE +28 > LENGTH THEN INC=LENGTH-PLACE ELSE INC = 28
6730    FOR PLACE1=PLACE+INC TO PLACE STEP -1
6740          IF MID$(QUES$,PLACE1,1)=CHR$(32) GOTO 6760
6750    NEXT PLACE1
6760    PLACE1$=MID$(QUES$,PLACE,PLACE1-PLACE)
6770    LOCATE J,5:PRINT PLACE1$
6780    IF LENGTH <= PLACE1 THEN GOTO 6810
6790    PLACE=PLACE1+1
6800 NEXT J
6810 LINE (0,88)-(20,108),1,BF
6820 LINE (0,162)-(20,182),2,BF
6830 CIRCLE (10,98),8,0
6840 LINE (12,100)-(17,105),0
6850 LINE (2,180)-(10,164),0:LINE -(18,180),0
6860 LINE (7,172)-(13,172),0
6870 LINE (260,90)-(320,93),1,BF
6880 LINE (260,93)-(262,165),1,BF
6890 LINE (320,93)-(317,165),1,BF
6900 LINE (260,165)-(320,162),1,BF
6910 LINE (262,105)-(317,105):LINE -(290,132):LINE -(263,106)
6920 PAINT (290,110),3
6930 LINE (262,160)-(317,105),2:LINE (261,160)-(316,105),2:LINE (263,160)-(318,105),2
6940 LINE (317,160)-(262,105),2:LINE (318,160)-(263,105),2:LINE (316,160)-(261,105),2
6950 LINE (261,161)-(318,161),2:LINE (261,162)-(318,162),2
6960 LINE (261,104)-(318,104),2
6966 LINE (290,130)-(290,160),3
6970 TOL=CVS(TOL$)
6980 IF TOL=0 OR ADVANCE=1 THEN HARD=1 ELSE HARD=0
6990 IF HARD=0 THEN RES=CVI(RES$) ELSE RES=34
7000 ANS1$=MID$(ANS$,1,RES)
```

```
7010 A$=INKEY$
7020 IF A$=CHR$(13) OR A$="" THEN GOTO 7030
7030 COUNT=0
7040 ANS2$=STRING$(LEN(ANS1$),32)
7050 FOR J=LEN(ANS1$) TO 1 STEP -1
7060    IF MID$(ANS1$,J,1)<>CHR$(32) AND MID$(ANS1$,J,1)<>CHR$(45) AND MID$(ANS1$,J,1)<>CHR$(46) AND MID$(ANS1$,J,1)<>CHR$(47) AND MI
7070 NEXT J
7080 IF HARD=0 THEN ENDC=J ELSE ENDC=34
7090 IF HARD=1 THEN GOTO 7180
7100 FOR J=1 TO LEN(ANS1$)
7110    IF MID$(ANS1$,J,1)=CHR$(32) THEN MID$(ANS2$,J,1)=CHR$(32):COUNT=COUNT+1:GOTO 7170
7120    IF MID$(ANS1$,J,1)=CHR$(45) THEN MID$(ANS2$,J,1)=CHR$(45):COUNT=COUNT+1:GOTO 7170
7130    IF MID$(ANS1$,J,1)=CHR$(46) THEN MID$(ANS2$,J,1)=CHR$(46):COUNT=COUNT+1:GOTO 7170
7140    IF MID$(ANS1$,J,1)=CHR$(47) THEN MID$(ANS2$,J,1)=CHR$(47):COUNT=COUNT+1:GOTO 7170
7150    IF MID$(ANS1$,J,1)=CHR$(39) THEN MID$(ANS2$,J,1)=CHR$(39):COUNT=COUNT+1:GOTO 7170
7160    IF HARD=0 THEN LOCATE 23,J+4:PRINT CHR$(45)
7170 NEXT J
7180 LOCATE 22,5:PRINT ANS2$
7190 LAST=1:X=1
7195 TEMP$=MID$(TIME$,1,9)
7200 ZTIME=60*VAL(MID$(TEMP$,4,2))+VAL(MID$(TEMP$,7,2))
7210 FOR J=1 TO 500001
7220    IF HARD=0 THEN LOCATE 23,LAST+4:PRINT CHR$(45)
7230    IF HARD=1 THEN LOCATE 23,LAST+4:PRINT CHR$(32)
7240    LOCATE 23,X+4:PRINT CHR$(24)
7250    A$=INKEY$
7272    TEMP$=MID$(TIME$,1,9)
7274    CTIME=60*VAL(MID$(TEMP$,4,2))+VAL(MID$(TEMP$,7,2))
7280    IF CTIME-ZTIME<0 THEN CTIME=CTIME+3600
7290    TIMOUT=180-(CTIME-ZTIME)
7300 IF TIMOUT=170 THEN LINE (263,105)-(316,105),2:LINE (263,160)-(316,160)
7310 IF TIMOUT=160 THEN LINE (264,106)-(315,106),0:LINE (264,159)-(315,159)
7320 IF TIMOUT=150 THEN LINE (265,107)-(314,107),0:LINE (265,158)-(314,158)
7330 IF TIMOUT=140 THEN LINE (266,108)-(313,108),0:LINE (266,157)-(313,157)
7340 IF TIMOUT=130 THEN LINE (267,109)-(312,109),0:LINE (267,156)-(312,156)
7350 IF TIMOUT=120 THEN LINE (268,110)-(311,110),0:LINE (268,155)-(311,155)
7360 IF TIMOUT=111 THEN LINE (269,111)-(310,111),0:LINE (269,154)-(310,154)
7370 IF TIMOUT=101 THEN LINE (270,112)-(309,112),0:LINE (270,153)-(309,153)
7380 IF TIMOUT=91 THEN LINE (271,113)-(308,113),0:LINE (271,152)-(308,152)
7390 IF TIMOUT=82 THEN LINE (272,114)-(307,114),0:LINE (272,151)-(307,151)
7400 IF TIMOUT=73 THEN LINE (273,115)-(306,115),0:LINE (273,150)-(306,150)
7410 IF TIMOUT=65 THEN LINE (274,116)-(305,116),0:LINE (274,149)-(305,149)
7420 IF TIMOUT=57 THEN LINE (275,117)-(304,117),0:LINE (275,148)-(304,148)
7430 IF TIMOUT=50 THEN LINE (276,118)-(303,118),0:LINE (276,147)-(303,147)
7440 IF TIMOUT=43 THEN LINE (277,119)-(302,119),0:LINE (277,146)-(302,146)
7450 IF TIMOUT=37 THEN LINE (278,120)-(301,120),0:LINE (278,145)-(301,145)
7460 IF TIMOUT=31 THEN LINE (279,121)-(300,121),0:LINE (279,144)-(300,144)
7470 IF TIMOUT=26 THEN LINE (280,122)-(299,122),0:LINE (280,143)-(299,143)
7480 IF TIMOUT=21 THEN LINE (281,123)-(298,123),0:LINE (281,142)-(298,142)
7490 IF TIMOUT=17 THEN LINE (282,124)-(297,124),0:LINE (282,141)-(297,141)
7500 IF TIMOUT=13 THEN LINE (283,125)-(296,125),0:LINE (283,140)-(296,140)
7510 IF TIMOUT=10 THEN LINE (284,126)-(295,126),0:LINE (284,139)-(295,139)
7520 IF TIMOUT=7 THEN LINE (285,127)-(294,127),0:LINE (285,138)-(294,138)
7530 IF TIMOUT=5 THEN LINE (286,128)-(293,128),0:LINE (286,137)-(293,137)
7540 IF TIMOUT=3 THEN LINE (287,129)-(292,129),0:LINE (287,136)-(292,136)
7550 IF TIMOUT=2 THEN LINE (288,130)-(291,130),0:LINE (288,135)-(291,135)
7560 IF TIMOUT=1 THEN LINE (289,131)-(290,131),0:LINE (289,134)-(290,134)
7570    LOCATE 13,35:PRINT TIMOUT
7580    IF TIMOUT <=0 THEN GOTO 7890
7610    IF LEN(A$)=2 THEN GOTO 7700
7620    IF A$=CHR$(8) THEN GOTO 7680
7630    IF A$="" THEN GOTO 7250
7640    IF A$=CHR$(13) THEN GOTO 7890
7650    LOCATE 22,X+4:PRINT A$:MID$(ANS2$,X,1)=A$
7660    LAST=X:X=X+1:GOTO 7750
7670 NEXT J
7680 IF A$=CHR$(8) AND HARD=0 THEN LOCATE 23,X+4:PRINT CHR$(45):MID$(ANS2$,LAST,1)=CHR$(32):LOCATE 22,LAST+4:PRINT CHR$(32):X=LAST:LA
7690 IF A$=CHR$(8) AND HARD=1 THEN LOCATE 23,X+4:PRINT CHR$(32):MID$(ANS2$,LAST,1)=CHR$(32):LOCATE 22,LAST+4:PRINT CHR$(32):X=LAST:LA
7700 AT$=RIGHT$(A$,1)
7710 IF AT$="M" THEN LAST=X:X=X+1:GOTO 7750
7720 IF AT$="K" AND HARD=0 THEN LOCATE 23,X+4:PRINT CHR$(45):X=LAST:LAST=LAST-1:GOTO 7820
7730 IF AT$="K" AND HARD=1 THEN LOCATE 23,X+4:PRINT CHR$(32):X=LAST:LAST=LAST-1:GOTO 7820
7740 GOTO 7670
7750 IF X>ENDC THEN X=1:GOTO 7670
7760 IF MID$(ANS1$,X,1)=CHR$(32) AND HARD=0 THEN X=X+1:GOTO 7750
7770 IF MID$(ANS1$,X,1)=CHR$(45) AND HARD=0 THEN X=X+1:GOTO 7750
```

```
7780 IF MID$(ANS1$,X,1)=CHR$(46) AND HARD=0 THEN X=X+1:GOTO 7750
7790 IF MID$(ANS1$,X,1)=CHR$(47) AND HARD=0 THEN X=X+1:GOTO 7750
7800 IF MID$(ANS1$,X,1)=CHR$(39) AND HARD=0 THEN X=X+1:GOTO 7750
7810 GOTO 7670
7820 IF LAST<1 THEN LAST=ENDC:GOTO 7670
7830 IF MID$(ANS1$,LAST,1)=CHR$(32) AND HARD=0 THEN LAST=LAST-1:GOTO 7820
7840 IF MID$(ANS1$,LAST,1)=CHR$(45) AND HARD=0 THEN LAST=LAST-1:GOTO 7820
7850 IF MID$(ANS1$,LAST,1)=CHR$(46) AND HARD=0 THEN LAST=LAST-1:GOTO 7820
7860 IF MID$(ANS1$,LAST,1)=CHR$(47) AND HARD=0 THEN LAST=LAST-1:GOTO 7820
7870 IF MID$(ANS1$,LAST,1)=CHR$(39) AND HARD=0 THEN LAST=LAST-1:GOTO 7820
7880 GOTO 7670
7890 IF ANS2$=ANS1$ THEN GOSUB 8710:GOTO 6320
7900 IF ANS1$="TRUE   " AND ANS2$="T" THEN GOSUB 8710:GOTO 6320
7910 IF ANS1$="YES    " AND ANS2$="Y" THEN GOSUB 8710:GOTO 6320
7920 IF ANS1$="FALSE  " AND ANS2$="F" THEN GOSUB 8710:GOTO 6320
7930 IF ANS1$="NO     " AND ANS2$="N" THEN GOSUB 8710:GOTO 6320
7940 IF TOL=0 THEN GOSUB 9310:GOTO 8030
7950 IF TOL >= 1 AND (ABS(VAL(ANS2$)-VAL(ANS1$)) <= TOL) THEN GOSUB 8710:GOTO 6320
7960 IF TOL >= 1 AND (ABS(VAL(ANS2$)-VAL(ANS1$)) > TOL) THEN GOSUB 9310:GOTO 8030
7970 COUNT1=0
7980 FOR J=1 TO CVI(RES$)
7990     IF MID$(ANS1$,J,1)=MID$(ANS2$,J,1) THEN COUNT1=COUNT1+1
8000 NEXT J
8010 IF (COUNT1-COUNT) >= TOL*(CVI(RES$)-COUNT) THEN GOSUB 9000:GOTO 6320
8020 GOSUB 9310
8030 NEXT PLAYER
8040 GOTO 9820
8050 NEXT QUSNUM
8060 REM CATEGORY SELECTION PAGE
8070 SCREEN 1,0:COLOR 0,1:CLS
8080 LOCATE 3,4:PRINT "PLAYER:":LOCATE 3,12:PRINT PLAYERS$(PLAYER)
8090 VALUE=0
8100 LOCATE 3,25:PRINT "VALUE:":LOCATE 3,31:PRINT VALUE
8110 LINE (10,4)-(300,36),2,B:LINE (18,12)-(292,28),2,B
8120 PAINT (14,8),2
8130 LINE (10,28)-(300,60),2,B:LINE (18,36)-(292,52),2,B
8140 PAINT (14,52),2
8150 LINE (5,90)-(105,190),1,B:LINE (15,100)-(95,180),1,B
8160 PAINT (10,95),1
8170 LINE (110,90)-(210,190),1,B:LINE (120,100)-(200,180),1,B
8180 PAINT (115,95),1
8190 LINE (215,90)-(315,190),1,B:LINE (225,100)-(305,180),1,B
8200 PAINT (220,95),1
8210 FOR J=1 TO 20
8220    IF SOUNDON=1 THEN SOUND 200,2
8230    WHICH(1)=INT(RND*6)+1
8240    X=15:Y=100
8250    ON WHICH(1) GOSUB 8330,8340,8350,8360,8370,8380
8260    WHICH(2)=INT(RND*6)+1
8270    X=120:Y=100
8280    ON WHICH(2) GOSUB 8330,8340,8350,8360,8370,8380
8290    WHICH(3)=INT(RND*6)+1
8300    X=225:Y=100
8310    ON WHICH(3) GOSUB 8330,8340,8350,8360,8370,8380
8320 NEXT J:GOTO 8390
8330 LINE (X,Y)-(X+80,Y+80),0,BF:PUT (X,Y),PEOPLE#:RETURN
8340 LINE (X,Y)-(X+80,Y+80),0,BF:PUT (X,Y),NAVY#:RETURN
8350 LINE (X,Y)-(X+80,Y+80),0,BF:PUT (X,Y),HIST#:RETURN
8360 LINE (X,Y)-(X+80,Y+80),0,BF:PUT (X,Y),OTHER#:RETURN
8370 LINE (X,Y)-(X+80,Y+80),0,BF:PUT (X,Y),GEO#:RETURN
8380 LINE (X,Y)-(X+80,Y+80),0,BF:PUT (X,Y),WILD#:RETURN
8390 IF (WHICH(1)=6 AND WHICH(2)=6 AND WHICH(3)=6) THEN VALUE=VALUE+150:FOR K=1 TO 10000:NEXT:GOTO 8100
8400 IF WHICH(1)<>6 AND ((WHICH(1)=WHICH(2)) OR WHICH(2)=6) AND ((WHICH(1)=WHICH(3)) OR WHICH(3)=6) THEN SELECT=1:GOTO 8530
8410 IF WHICH(2)<>6 AND ((WHICH(2)=WHICH(1)) OR WHICH(1)=6) AND ((WHICH(2)=WHICH(3)) OR WHICH(3)=6) THEN SELECT=2:GOTO 8530
8420 IF WHICH(3)<>6 AND ((WHICH(3)=WHICH(1)) OR WHICH(1)=6) AND ((WHICH(3)=WHICH(2)) OR WHICH(2)=6) THEN SELECT=3:GOTO 8530
8430 IF WHICH(1) <> 6 THEN LOCATE 11,7:PRINT "1":LOCATE 6,18:PRINT "1 OR"
8440 IF WHICH(2) <> 6 THEN LOCATE 11,20:PRINT "2":LOCATE 6,23:PRINT "2"
8450 IF WHICH(3) <> 6 THEN LOCATE 11,33:PRINT "3":LOCATE 6,28:PRINT "3"
8460 IF WHICH(2)<>6 AND WHICH(3)<>6 THEN LOCATE 6,25:PRINT "OR"
8470 LOCATE 6,12:PRINT "PRESS"
8480 IF WHICH(1)<>6 AND WHICH(2)<>6 AND WHICH(3)<>6 THEN LOCATE 6,20:PRINT ", "
8490 SELECT$=INPUT$(1)
8500 SELECT=VAL(SELECT$)
8510 IF SELECT <> 1 AND SELECT <> 2 AND SELECT <> 3 THEN GOTO 8490
8520 IF WHICH(SELECT) = 6 AND (WHICH(1) <> 6 OR WHICH(2) <> 6 OR WHICH(3) <> 6) THEN GOTO 8490
8530 FOR J=1 TO 3
```

```
8540    IF WHICH(J)=WHICH(SELECT) THEN VALUE = VALUE +50
8550    IF WHICH(J)=6 THEN VALUE = VALUE +50
8560 NEXT J
8570 FOR K=1 TO 5
8580 LOCATE 3,31:PRINT VALUE
8590 FOR J=0 TO 10
8600 IF (WHICH(1)=WHICH(SELECT)) OR (WHICH(1)=6) THEN LINE (15-J,100-J)-(95+J,180+J),2,B
8610 IF (WHICH(2)=WHICH(SELECT)) OR (WHICH(2)=6) THEN LINE (120-J,100-J)-(200+J,180+J),2,B
8620 IF (WHICH(3)=WHICH(SELECT)) OR (WHICH(3)=6) THEN LINE (225-J,100-J)-(305+J,180+J),2,B
8630 NEXT J
8640 FOR J=0 TO 10
8650 IF (WHICH(1)=WHICH(SELECT)) OR (WHICH(1)=6) THEN LINE (15-J,100-J)-(95+J,180+J),1,B
8660 IF (WHICH(2)=WHICH(SELECT)) OR (WHICH(2)=6) THEN LINE (120-J,100-J)-(200+J,180+J),1,B
8670 IF (WHICH(3)=WHICH(SELECT)) OR (WHICH(3)=6) THEN LINE (225-J,100-J)-(305+J,180+J),1,B
8680 NEXT J
8690 NEXT K
8700 RETURN
8710 REM
8720 REM RIGHT ANSWER PAGE
8730 REM
8740 SCREEN 1:COLOR 0,1:CLS
8750 CORRECT(PLAYER,WHICH(SELECT))=CORRECT(PLAYER,WHICH(SELECT))+1
8760 SCORE(PLAYER)=SCORE(PLAYER)+VALUE
8770 LOCATE 3,8:PRINT "PLAYER":LOCATE 4,8:PRINT PLAYERS$(PLAYER)
8780 LOCATE 3,27:PRINT "SCORE":LOCATE 4,27:PRINT SCORE(PLAYER)
8790 LINE(10,2)-(290,44),1,B:LINE (20,12)-(280,34),1,B:PAINT (15,10),1
8800 LOCATE 10,12:PRINT "THAT WAS PERFECT !"
8810 LOCATE 12,14:PRINT VALUE;" POINTS"
8820 LINE(10,58)-(290,108),2,B:LINE (20,68)-(280,98),2,B:PAINT (15,65),2
8830 LOCATE 16,3:PRINT "ANSWER: "
8840 LOCATE 17,3:PRINT ANS1$
8850 PLACE=1
8860 LENGTH=LEN(REMARK$)
8870 FOR J=19 TO 21
8880    IF PLACE+33 > LENGTH THEN INC=LENGTH-PLACE ELSE INC=33
8890    FOR PLACE1=PLACE+INC TO PLACE STEP -1
8900        IF MID$(REMARK$,PLACE1,1)=CHR$(32) GOTO 8920
8910    NEXT PLACE1
8920    PLACE1$=MID$(REMARK$,PLACE,PLACE1-PLACE)
8930    LOCATE J,3:PRINT PLACE1$
8940    IF LENGTH <= PLACE1 THEN GOTO 8970
8950    PLACE=PLACE1+1
8960 NEXT J
8970 IF SOUNDON=1 THEN PLAY "O1 L10;CEG;O2 L6;C;O1 L6;G;O2 L4;C"
8980 LOCATE 23,8:PRINT "PRESS ANY KEY TO CONTINUE":DUMMY$=INPUT$(1)
8990 RETURN
9000 REM
9010 REM PARTIAL ANSWER PAGE
9020 REM
9030 SCREEN 1:COLOR 0,1:CLS
9040 VALUE=VALUE/2
9050 SCORE(PLAYER)=SCORE(PLAYER)+VALUE
9060 CORRECT(PLAYER,WHICH(SELECT))=CORRECT(PLAYER,WHICH(SELECT))+1
9070 LOCATE 3,8:PRINT "PLAYER":LOCATE 4,8:PRINT PLAYERS$(PLAYER)
9080 LOCATE 3,27:PRINT "SCORE":LOCATE 4,27:PRINT SCORE(PLAYER)
9090 LINE(10,2)-(290,44),1,B:LINE (20,12)-(280,34),1,B:PAINT (15,10),1
9100 LOCATE 10,3:PRINT "THE CORRECT ANSWER IS:"
9110 LOCATE 11,3:PRINT ANS1$
9120 LOCATE 13,3:PRINT "YOUR ANSWER WAS:"
9130 LOCATE 14,3:PRINT ANS2$
9140 LOCATE 8,12:PRINT "PARTIAL CREDIT"
9150 LOCATE 16,13:PRINT VALUE;" POINTS"
9160 LINE (10,50)-(290,134),2,B
9170 PLACE=1
9180 LENGTH=LEN(REMARK$)
9190 FOR J=19 TO 21
9200    IF PLACE+33 > LENGTH THEN INC=LENGTH-PLACE ELSE INC=33
9210    FOR PLACE1=PLACE+INC TO PLACE STEP -1
9220        IF MID$(REMARK$,PLACE1,1)=CHR$(32) GOTO 9240
9230    NEXT PLACE1
9240    PLACE1$=MID$(REMARK$,PLACE,PLACE1-PLACE)
9250    LOCATE J,3:PRINT PLACE1$
9260    IF LENGTH <= PLACE1 THEN GOTO 9290
9270    PLACE=PLACE1+1
9280 NEXT J
9290 LOCATE 23,8:PRINT "PRESS ANY KEY TO CONTINUE":DUMMY$=INPUT$(1)
```

```
300  RETURN
310  REM
320  REM WRONG ANSWER PAGE
330  REM
340  SCREEN 1:COLOR 0,1:CLS
350  LOCATE 3,8:PRINT "PLAYER":LOCATE 4,8:PRINT PLAYER$(PLAYER)
360  LOCATE 3,27:PRINT "SCORE":LOCATE 4,27:PRINT SCORE(PLAYER)
370  LINE(10,2)-(290,44),1,B:LINE (20,12)-(280,34),1,B:PAINT (15,10),1
380  LOCATE 8,3:PRINT "THE CORRECT ANSWER IS:"
390  LOCATE 9,3:PRINT ANS1$
400  LOCATE 11,3:PRINT "YOUR ANSWER WAS:"
410  LOCATE 12,3:PRINT ANS2$
420  LOCATE 14,13:PRINT "  0  POINTS"
430  LINE (10,46)-(290,120),2,B
440  PLACE=1
450  LENGTH=LEN(REMARKS$)
460  FOR J=18 TO 20
470     IF PLACE+33 > LENGTH THEN INC=LENGTH-PLACE ELSE INC=33
480     FOR PLACE1=PLACE+INC TO PLACE STEP -1
490        IF MID$(REMARKS$,PLACE1,1)=CHR$(32) GOTO 9510
500     NEXT PLACE1
510     PLACE1$=MID$(REMARKS$,PLACE,PLACE1-PLACE)
520     LOCATE J,3:PRINT PLACE1$
530     IF LENGTH <= PLACE1 THEN GOTO 9560
10140 LOCATE 2,1:PRINT "          PERFORMANCE EVALUATION          "
10150 LOCATE 5,1:PRINT "NAME   # CORRECT  # ATTEMPTED  % RATING "
10160 FOR J=1 TO PLAYNUM
10170    LOCATE 5+J*2,1:PRINT PLAYER$(J)
10180    TEMP=CORRECT(J,1)+CORRECT(J,2)+CORRECT(J,3)+CORRECT(J,4)+CORRECT(J,5)
10190    LOCATE 5+J*2,11:PRINT TEMP
10200    LOCATE 5+J*2,22:PRINT ATTEMPT(J)
10210    IF ATTEMPT(J)>0 THEN PERC=INT(100*TEMP/ATTEMPT(J)+.5) ELSE PERC=0
10220    LOCATE 5+J*2,29:PRINT PERC
10230    IF PERC<=25 THEN LOCATE 5+J*2,34:PRINT "SEAMAN"
10240    IF PERC>25 AND PERC<=50 THEN LOCATE 5+J*2,34:PRINT "CHIEF"
10250    IF PERC>50 AND PERC<=75 THEN LOCATE 5+J*2,34:PRINT "OFFICER"
10260    IF PERC>75 THEN LOCATE 5+J*2,34:PRINT "ADMIRAL"
10270 NEXT J
10280 LOCATE 22,1:PRINT "          PRESS ANY KEY TO CONTINUE        "
10290 DUMMY$=INPUT$(1)
10300 SCREEN 1:COLOR 4,1:CLS
10310 LOCATE 2,10:PRINT "THE WINNER IS ";PLAYER$(1)
10320 LOCATE 10,5:PRINT "WOULD YOU LIKE TO PLAY ANOTHER "
10330 LOCATE 11,5:INPUT "       GAME (Y OR N)";IN$
10340 IF IN$<> "Y" AND IN$<> "N" THEN GOTO 10330
10350 IF IN$="N" THEN SYSTEM
10360 CLOSE #1
10370 CLOSE #2
10380 LOCATE 15,5:PRINT "WOULD YOU LIKE TO PLAY WITH THE "
10390 LOCATE 16,5:INPUT "      SAME PLAYERS (Y OR N)";IN$
10400 IF IN$<> "Y" AND IN$<> "N" THEN GOTO 10390
10410 IF IN$="Y" GOTO 6040
10420 IF IN$="N" GOTO 5820
10430 SYSTEM
10440 CHECK=1:RETURN
10450 SKIP=1:RETURN
```

What is claimed is:

1. A method of computerized education, testing and entertainment in a format suitable for competition wherein participants are encouraged by the granting of full and partially credit for answers that demonstrate only partial knowledge of the subject matter, said method comprising:

designating a first category;

preparing a first question for said first category having at least one character;

preparing an answer to said first question that has a plurality of parts wherein a first part thereof is at least one character in length and is the perfect answer to said question, and a second part thereof is a preselected character code that determines the deviation by a numerical value from said perfect answer that will be tolerated for credit;

designating at least one additional category, and preparing at least one question therefor and an answer thereto, as above for said first category; converting a general purpose computer to a special purpose device by programming it to perform the following steps;

prepare an electronic question-answer set from the questions and answers in each said category;

store in order by category for electronic retrieval the question-answer sets prepared;

select in accordance with and in response to input from a keyboard one said category;

randomly select and retrieve from electronic storage a first question from the question-answer set of the selected category, and retrieve from electronic storage for comparison the answer to the selected question;

visually display said randomly selected question;
respond to an input from said keyboard by automatically comparing the character that appears in a first position of the input to the character in the corresponding first position of the retrieved answer for said first question, and by automatically comparing the character in each additional position of the input to the corresponding position of the retrieved answer;
evaluate said input from the keyboard in accordance with said comparison and the answer's numerical tolerance value, wherein a tolerance value of zero requires in order for credit to be given that the characters in the response match position by position the corresponding characters in said retrieved answer, a value greater than one identifies an answer in numeric form and for credit to be given requires that the response not deviate from the answer by more than the tolerance value, and a tolerance value between one and zero requires for credit to be given that the percent of characters in the response which match position by position the characters in the retrieved answer be greater than or equal to the percentage value of the tolerance;
grading said input automatically in accordance with said evaluation, wherein an input in which all characters in the input match the corresponding characters in the answer is awarded a predetermined full credit value, and a input that is not awarded full credit value is awarded partial credit value if the input is within the answer's tolerance value; and
advancing in response to said evaluation, each said category by one question.

* * * * *